Patented Apr. 29, 1930

1,756,817

UNITED STATES PATENT OFFICE

CARLETON ELLIS AND JOSEPH V. MEIGS, OF MONTCLAIR, NEW JERSEY, ASSIGNORS, BY MESNE ASSIGNMENTS, TO CARLETON ELLIS, OF MONTCLAIR, NEW JERSEY

CHEMICAL PRODUCT AND PROCESS FOR MAKING SAME

No Drawing. Application filed July 28, 1919, Serial No. 313,820. Renewed July 22, 1929.

This invention relates to viscous, resinous, plastic, colloidal and amorphous bodies and in particular to those bodies produced by the action of the chlorides of sulphur on phenols, cresols, creosotes, or other phenoloid bodies or other reactive bodies, and on substances containing the same, all as will be hereinafter set forth and as claimed. While there are, in the prior literature, certain references which mention reacting with a chlorid of sulphur, on phenols, there has not been described, in any literature with which we are familiar, any commercial method of producing a commercially useful resin, by this reaction.

As raw materials sulphur monochloride, $S_2Cl_2$ or sulphur dichloride $SCl_2$ or mixtures of these substances in the presence or absence of free sulphur may on the one hand be used. On the other hand any of the phenoloid or cresoloid bodies which are more or less reactive under the conditions hereinafter set forth may be used, such as ordinary or commercial phenol, cresol, creosote, cresylic acid, and also in some cases other bodies of different but analogous structure, such as naphthol, anthranole, hydroquinone, naphthoquinone, anthraquinol and anisole and similar bodies, that is substances having an aromatic nucleus or nuclei and usually containing a hydroxyl group or groups, substituted in the ring. Or, derivatives of these bodies may be used, that is amino or carboxyl or alkyl, acyl or aryl, or arylamino or alkylamino, or acylamino radicals may also be substituted in the ring in the presence of the hydroxyl group or groups substituted at a different point or points in the ring. Or phenolic or phenoloid bodies containing chlorine, bromine or iodine, or nitro groups for example, picric acid, dinitrophenol, chlorphenol may be used. In all the above cases it will be found that the phenoloid or phenolic body will react with the chlorides of sulphur to a greater or less extent depending upon the nature of the body and the nature of and position in the ring of the substituents other than hydroxyl, which are substituted or contained in the aromatic nucleus or nuclei. For example, resorcin reacts in the cold very sluggishly with sulphur monochloride, whereas phenol reacts violently. Salicylic acid is very similar to resorcin in this respect. This is probably due to stearic hindrance. On the other hand an alkyl group substituted in the ortho, meta or para position with regard to the hydroxyl group, increases rather than decreases the energy of the reaction between the phenolic body and sulphur mono- or dichloride. The reacting bodies may be brought together and caused to react in a number of ways, the choice of which depends partly upon the nature of the phenoloid bodies and partly upon the particular reaction product desired, for example, the sulphur chloride and the phenoloid body may be brought together as vapors in a suitable reaction chamber and the heat of reaction dissipated by cooling. Or the phenoloid body may be melted if a solid, or if a liquid it may be used as such, and the sulphur chloride may be gradually added to the liquid or liquefied substance. Or a certain amount of solvent may be employed to bring the phenoloid body into a liquid state. Although in some cases the use of a solvent leads to desirable products it is in general preferred to employ the phenoloid body in a concentrated condition. Where the sulphur chloride is added to the liquefied body it is sometimes useful to use mechanical agitation and to continue the mechanical agitation of the phenoloid body after all the sulphur chloride has been added. Still another method of bringing about the desired reaction consists in adding the phenoloid body either in the solid, liquid, or liquefied condition to a mass of sulphur chloride and continuing the addition until reaction has progressed to the desired degree. Or the sulphur chloride may be vaporized and its vapors (with or without admixture with gases (diluents) such as air, nitrogen, carbon dioxide and other suitable permanent gases) may be passed through or in intimate contact with the phenoloid body.

The feature of adding diluents to maintain the phenolic body in a liquid state, as well as claims specific to homologues of phenol and on cresol, are not included in the present case but in copending case Ser. No. 321,183, filed September 2, 1919.

The crude products obtained by the mutual reaction between sulphur chlorides and phenoloid bodies cannot be used immediately for some of the applications hereinafter described but must first be submitted to a purifying treatment in order to eliminate odorous bodies, free volatile acids and in some cases free sulphur or bodies containing a very large percentage of sulphur. The treatments which eliminate these bodies comprise in some cases treatment with specific solvents, in other cases treatment with organic solvents or water and subsequent treatment with a gaseous fluid such as steam or air.

*Example 1*

| | Parts by weight |
|---|---|
| Redistilled $S_2Cl_2$ | 185 |
| Phenol crystals | 300 |

The $S_2Cl_2$ was allowed to drop into the phenol which was in the melted condition at a temperature of 38° C. At the start the melted phenol was violently agitated by a mechanical stirrer during the addition of the sulphur chloride. The reaction mass began to get viscous when little more than half the sulphur chloride had been added. When all of the sulphur chloride had been added the temperature of the reaction mass was 51° C. The reaction vessel was now surrounded with water, and stirring was continued until the viscous, light-colored resinous mass changed to a waxy consistency.

*Example 2.*—250 grams of pure sulphur monochloride were added to 300 grams of melted phenol, the sulphur chloride being gradually dropped into the phenol which was in the melted condition at a temperature of 34½% C.; after all the sulphur chloride had been added the temperature of the reaction mass was 61° C. Agitation was continued a half hour after the addition of the last portion of the sulphur chloride in order to insure against the presence of any free sulphur chloride in the final product.

| | Grams |
|---|---|
| Weight of phenol | 300 |
| Weight of $S_2Cl_2$ | 250 |
| Total | 550 |
| Weight of crude product | 356 |
| Loss (largely as HCl) | 194 |

The product on cooling assumed a very firm waxy consistency.

It was washed thoroughly with boiling water. It was then heated to 130°–170° C. and a current of air blown through for a period of two hours. After cooling, the product weighed 290 grams. The loss due to washing and air-blowing was therefore about eighteen and a half per cent. This washing and air-blowing treatment changed the properties of the substance very markedly. The washed and air-blown product was decidedly viscous and colloidal whereas the original product had a waxy consistency. The substance produced in Example 2 was completely soluble in acetone or alcohol. By varying the ratio between sulphur chloride used and phenoloid body, products of different consistency and solubility may be obtained. This range is in general from a viscous fluid substance which is soluble in alcohhol, acetone and similar solvents up to a hard brittle resin which contains considerable amounts of material insoluble in alcohol, acetone and similar solvents.

*Example 3.*—To 300 parts by weight of commercial cresol at room temperature were added gradually 250 parts by weight of $S_2Cl_2$. The temperature of the reaction mixture steadily rose (from 24° C., initially) until all the sulphur chloride had been added when it was 79½° C. This action was more vigorous than in the case of ordinary phenol. The resulting product was extremely viscous and possessed a yellowish brown color. It was extracted for two hours with hot water and then blown with air at 130°–170° C. This product showed much less water-soluble material than the product described in Example 2 above.

The proportions of sulfur chlorid to cresol can be varied substantially, (and elsewhere in this specification we have referred to using a modification of this example in which 300 parts of cresol are treated with 250 to 300 of sulfur chlorid). However, for making the most satisfactory reaction products of these two materials which are completely soluble in alcohol, acetone and similar solvents, the ratio of the amounts of $S_2Cl_2$ to cresol should preferably not very greatly exceed seven to six.

*Example 4.*—To 500 parts by weight of sulfur chlorid melted phenol was added, drop by drop, while continuously stirring the mass. When 178 parts of the phenol had been added, the product was so viscous that the mechanical stirrer would not work. A yellow foam-like, hard, resinous mass was produced.

The viscous products described above, due to their treatment with hot water and blowing with air are odorless, stable products. In some cases it is desirable to partially or wholly effect the deodorization by the addition of ant-acid substances such as aniline and other aromatic bases and also alkali or alkaline earth salts of weak acids such as sodium borate or perborate, sodium carbonate or percarbonate, calcium carbonate, calcium borate, sodium silicate and the like. The addition of these ant-acid substances may advantageously take place in conjunction with the air-blowing described above and further insures against the development of acidity in the product on standing or keeping for any length of time.

By continuing the addition of the sulphur chloride to the phenoloid body until no more sulphur chloride will react solid resinous bodies and hard resins may be obtained. It is however often desirable to discontinue the addition of the sulphur chloride at the point where a viscous balsamic compound entirely soluble in acetone or alcohol is obtained. In the case of ordinary phenol or commercial cresol a body of this nature is obtained when in general between 250 and 350 grams of sulphur chloride have been gradually added to 100 grams of the phenol or cresol as the case may be. Instead of the extraction with hot water described above, treatment with a current of saturated or super-heated steam may be substituted with equally good results. This treatment with hot water or steam effects first a desirable deodorization of the product and secondly removes water-soluble material from the reaction product. This removal of water-soluble material improves the properties of the product.

In several places in this specification, we have referred to "parts by weight" and "parts by volume" (metric system). In such places "parts by weight" may be taken as kilos or grams and "parts by volume" should correspondingly be litres or cubic centimeters.

As stated above the amount of sulphur chloride added to the phenoloid body determines the nature of the product obtained and by adding to the phenoloid body as much sulphur chloride as the former will react with, a hard resin is obtained which however is not entirely soluble in alcohol or acetone and may be separated by such solvent action into two parts. The method of bringing about the formation of this hard resin is capable of considerable variation but depends upon the use of a relatively large amount of sulphur chloride in proportion to the amount of phenoloid body. This principle may be advantageously applied to the production of a hard resin by adding the phenoloid body to a mass of sulphur chloride, thus having at all times an excess of sulphur chloride present in which case the reaction goes to completion. As an example of the production of a hard resin in this manner an example will be given using ordinary phenol or carbolic acid although the same general results can be obtained by using other phenoloid bodies particularly cresol, creosote and the like.

500 parts by weight of sulphur chloride were placed in enamel-ware reaction vessel, and while being stirred vigorously with a mechanical stirrer there was dropped in melted phenol gradually. When 178 parts by weight of phenol had been added the product was extremely viscous, almost hard. A yellow, light colored, resinous mass was produced on cooling. The hardness of the product was increased on standing in the cold for three days. The resulting product when extracted with alcohol yields a very considerable proportion of insoluble material which however is soluble in carbon bisulphide. It is in fact a resin or product which contains a substantial quantity (well over 50%) of chemically combined sulphur. This has the property of changing upon the application of heat into a clear amber colored resin which is softened by heating to about 100° C., but which does not flow like most other resins when so heated. It possesses at this temperature an elasticity somewhat analogous to that of rubber. It may be incorporated with crude rubber and vulcanized. It may also be treated with chlorine gas whereupon it will be found that the material will react with the chlorine and a chlorinated hard resin will be obtained which possesses the property of being non-inflammable. This hard resin referred to may be produced by pushing the action between the phenoloid body and sulphur chloride to completion by the use of a relatively large proportion of sulphur chloride. Although in preparing a hard resin it is convenient to add the phenoloid body as above indicated to an excess of sulphur chloride this procedure is not absolutely necessary inasmuch as substantially the same result may be obtained by merely using a large quantity of sulphur chloride and adding this gradually to a phenoloid body. As a specific example of this particular phase of the invention the following is given: 300 parts by weight of phenol were melted and stirred vigorously with a mechanical stirrer, sulphur monochloride was added drop by drop without any cooling until the mixture was so viscous that mechanical stirring was very difficult. The total amount of sulphur chloride added was 470 parts by weight. (Specific gravity of sulphur monochloride taken as 1.68.) These proportions correspond to about 157 parts by weight of $S_2Cl_2$ to 100 parts by weight of phenol, and may be referred to as adding about 157% of sulfur chlorid to phenol. The resulting product on standing for a few days was a hard, spongy, resinous mass, light yellow in color. On treating the product of this character with denatured alcohol or a similarly acting solvent a portion of the product was precipitated. By filtering the solution containing this precipitate and evaporating the alcohol from the filtrate the residue was a transparent light yellow, very firm, viscous, colloidal, resinous product, completely soluble in alcohol or acetone.

It is not however necessary in order to obtain a hard resin by the general reaction described in the specification to push the reaction between sulphur chloride and the phenoloid body to completion. For some purposes a hard resin possessing a higher solubility in alcohol or in acetone than the hard resin produced by pushing the reaction between the sulphur chloride and phenoloid body to completion is desired. This may be accomplished in several ways. The alcohol-soluble reaction product produced by adding a relatively small amount of sulphur chloride to the phenoloid body as for example that produced by adding from 250 to 300 parts by weight of sulphur chloride to 300 parts by weight of phenol, cresol, creosote and the like may be taken and treated with chlorine gas. The chlorine readily attacks this viscous alcohol soluble product and by different degrees of chlorination the viscous alcohol-soluble product may be transformed into a resin of different degrees of hardness. By completely chlorinating such a viscous alcohol-soluble sulphur chloride phenoloid reaction product, a very hard resin may be obtained which has the advantage of being largely soluble in alcohol or acetone and hence is well adapted for use in paints, varnishes, and for other uses to which soluble resins are ordinarily put. The chlorination referred to may take place by passing dry chlorine into the anhydrous reaction product, or the chlorination may take place in the presence of water, that is the reaction product may be emulsified with water, and chlorine then passed into this emulsion. As a specific example of an embodiment of the invention in this particular phase the following is given:

A. Production of the alcohol soluble viscous reaction product. The operator took phenol, 400 parts by weight, and added sulphur chloride 500 parts by weight gradually with continuous stirring. The resulting product yielded a slight precipitate on treatment with alcohol or acetone. It was an extremely viscous compound, almost a solid at ordinary temperatures.

B. Production of the hard chlorinated resin.

The material as produced in A which contained a small amount of alcohol insoluble material was melted at as low a temperature as possible and a stream of chlorine gas was passed in. A vigorous reaction took place with the evolution of white fumes and after continuing the action of the chlorine until the reaction had subsided, and then cooling, a hard transparent resin was obtained with a slightly reddish color. It is largely soluble in alcohol or acetone in a manner similar to shellac and yields a very satisfactory film on the evaporation of a portion of the solution when the latter is applied as a film. It is an extremely stable substance and is not acted upon by nitric acid in the cold to any marked extent. It is also very stable as regards heat and burns only with great difficulty. It may be used preferably in combination with substances such as vulcanized oils, rubber, chlorinated naphthalene, gutta percha and the like as an insulating composition.

In addition to the two main methods described above for the preparation of a hard resin, the latter may also be obtained by the distillation of the soft viscous condensation product, for example with either a dry distillation or distillation in a current of steam or air. By subjecting the soft viscous condensation product (soluble in alcohol) to the action of a current of saturated or preferably superheated steam, the more volatile constituents are rapidly removed and the residue is a hard resin which possesses the advantage of being completely soluble in alcohol or acetone.

Furthermore a hard resin may be obtained by the action of nitric acid on the soft viscous alcohol soluble reaction product. This may be carried out by the addition of nitric acid of varying degrees of strength. By varying the concentration of the nitric acid, products containing more or less nitrogen (as nitro groups) may be obtained. The use of a dilute nitric acid causes oxidation to a large extent and for the purpose of preparing a hard resin it is preferred to use a dilute nitric acid, for example one containing ten per cent of $HNO_3$ by weight. One method by which the production of a hard resin by means of nitric acid was accomplished is as follows: 50 parts by weight of a viscous reaction product such for example as that prepared in Example 3 as above, was treated gradually with a mixture of 60 parts by weight of $HNO_3$ (sp. gr. 1.42) in 378 parts by weight of water. This solution contained 16 parts by weight of available oxygen. The mixture was boiled one and a half hours and the liquid then decanted; the residue was a sticky viscous mass, reddish in color which hardened to a solid resin on cooling. The aqueous solution gave a heavy precipitate on the addition of barium chloride indicating oxidation of the sulphur by the nitric acid. It also stained the fingers a bright yellow pointing to nitration of the benzene nucleus.

Instead of acting upon a purely phenoloid body or mixture of bodies with sulphur chloride it is preferable in some cases to mix the phenoloid body with another or other substances reactive towards sulphur chloride. For this purpose the unsaturated glycerides or fatty acids are suitable as well as the higher unsaturated hydrocarbons of the aliphatic and aromatic series. For example some of the unsaturated hydrocarbons recovered from the sludge acid of petroleum refining and which possess molecular weights corresponding preferably to a content of more than 15 carbon atoms to the molecule are desirable; also aromatic unsaturated hydrocarbons produced as residues, in the distillation of coal tar are also well suited for the purpose herein described, for example cumaron, indene, styrene, retene and the like. The purpose of these reactive hydrocarbons, glycerides and fatty acids is to modify the properties of the sulphur chloride phenoloid reaction product in order to give the product properties which would not be obtained with the pure phenoloid bodies or mixtures of the same. The resulting products are applicable for a number of purposes including rubber-compounding ingredients, electric wire insulation and the like. As a specific embodiment of this phase of the invention the following example is given:

A. 87 parts by weight (metric system) of a hard resin prepared by the action of an excess of sulphur chloride on commercial carbolic acid was thoroughly mixed with 87 parts by weight of Chinese wood oil. 10 parts of talc was then incorporated and the mixture heated in a mold for one hour. A solid elastic hard rubber-like mass was produced.

B. To 200 parts by weight of phenol, 100 parts by volume (metric system) of cottonseed oil was added and the mixture heated until the phenol melted. Sulphur monochloride 120 parts by volume (being 200 parts by weight) was slowly added to the mechanically agitated mixture of phenol and cottonseed oil. A sticky brownish black mass was obtained which was practically insoluble in gasoline but completely soluble in acetone or alcohol.

It has already been mentioned that the hard resins produced by the action of sulphur chloride on phenoloid bodies by carrying the reaction to completion as hereinabove described are bodies which are not entirely soluble, in fact contain a large amount of material insoluble in alcohol, acetone and similar solvents.

Those phenoloid sulfur chlorid reaction products which are completely soluble in acetone or alcohol and which have or have not been blown with air at an elevated temperature, are soluble in sodium hydroxide solution, and also in some instances in sodium carbonate solution. They are different in many respects from ordinary phenol or cresol. This solubility in sodium carbonate solution indicates that the treatment of the phenoloid body with sulphur chloride has probably produced substitution in the aromatic nucleus or nuclei groups, which make the phenolic group more acid than it is in ordinary phenol.

These bodies are very stable substances particularly as regards stability against hydrolysis with water or caustic alkali. As an example of this it may be mentioned that such a body for example that produced by the treatment of cresol with a limited amount of sulphur chloride after the manner described in the above specification namely, by the addition of 250 parts by weight of sulphur chloride to 300 parts by weight of cresol, on treatment with an excess of a fifty per cent sodium hydroxide solution for eighteen hours at a temperature of 150–180° C. was hydrolyzed only to the extent of thirty-nine per cent. This indicates the high stability of the phenoloid sulphur chloride soluble reaction product.

It is also especially to be noted that the phenoloid sulphur chloride reaction products which are soluble in alcohol, acetone and similar solvents and also in sodium hydroxide and sodium carbonate solution, on being treated for some time with caustic soda in a more or less concentrated condition, yield, when this solution is acidified, a considerable amount of sulphur dioxide. This shows plainly that the sulphur in these compounds is oxidized at some time either during the preparation of said compounds or by treatment with caustic soda. It is a well-known fact that sulphones are extremely stable substances.

As a specific example setting forth the treatment with caustic soda in a phenoloid sulphur chloride reaction product the following is given. 147 parts by weight of the cresol sulphur chloride reaction product prepared by adding 250 parts by weight of pure sulphur monochloride to 300 parts by weight of commercial cresol, were it treated with a solution of 120 parts by weight of NaOH in 120 parts by weight of water. The reaction product dissolved in this solution with a considerable evolution of heat showing that said reaction product has a decidedly acid character. The mixture was heated for eighteen hours in an oil bath the temperature of which varied from 150 to 180° C. To the cooled mass were added 300 parts by weight of water, and the product was acidified with hydrochloric acid. Some odor of hydrogen sulphide was evolved but it was not nearly so much in evidence as the exceedingly strong odor of sulphur dioxide which appeared as soon as acidification was complete. It should be mentioned that this particular reaction product, before treatment with caustic soda solution, had been submitted to a treatment with a stream of air blown through the product while the latter was at a temperature of 130–170° C., this treatment lasting for several hours. From the acidified solution 90 parts by weight of the original product was precipitated by the acidification step. Hence about sixty-one per cent of the original product was recovered showing that thirty-nine per cent had been hydrolyzed.

An important property of the sulphur-containing resins described herein, is the fact that they are capable of dissolving in molten free sulphur, to give a homogeneous blend of sulphur with the resin, which does not separate upon cooling to resolidification.

To recapitulate this invention embraces the process of making resins and other products by reaction of, or with a phenolic body such as phenol and its homologues and a reactive substance of the nature of sulphur chloride but the invention is not limited strictly to the materials and products produced herein but embraces equivalent reagents and equivalent products. The invention not only embraces the phenol-sulphur chloride reaction product itself but also includes this product admixed or incorporated with various other bodies such as oils, resins, waxes, bitumens, and extending and filling material such as talc and various mineral fillers, kieselguhr, wood flour, asbestos and other substances of like character serving to form useful plastic molded or other articles or objects adapted for manifold uses in the arts.

What we claim is:—

1. The process of making a phenol sulfur reaction product which consists in maintaining a phenolic body in a fluid condition and adding thereto successive small portions of sulfur halide, the amount of the phenolic body being proportional to the range of 185 and 470 parts of sulfur chloride per 300 parts of $C_6H_5OH$.

2. The process of making a reaction product which consists in maintaining a phenolic body in a liquid condition, and adding thereto liquid sulfur mono-chloride, the amount of the latter being at least as great as the amount of the former.

3. The process of making a phenol sulfur chloride resinous product which comprises gradually adding at least 5 parts of sulfur chloride to 6 parts of liquid phenol, and purifying the resinous product.

4. The process of making a phenol sulfur chloride resinous reaction product which consists in maintaining a body of liquid phenol, adding gradually thereto more than seven-sixths its weight of sulfur chloride, and purifying the resinous product.

5. The process of making a phenol sulfur chloride resinous reaction product which comprises reacting on a phenolic body computed herein as phenol, with over three-fifths of its own weight of sulphur chloride, and purifying the resinous product by treating with a chemically inert gaseous fluid at above the boiling point of water.

6. As a new product, the solid reaction product of a phenol and a halide of sulfur, such product being insoluble in water, of firm consistency, substantially free from odor, and free from haloid acids, such product being soluble in large part at least, in alcohol, acetone, and in mixtures of acetone and amyl acetate, such product also being soluble in caustic soda solution.

7. The process of making a resinous product which comprises reacting with sulfur chloride upon a phenol, the amount of the former being sufficient to convert all of the latter into a normally solid resin, and deodorizing the product.

8. The process of making a resinous product which comprises reacting upon a phenol, with a quantity of sulfur chlorid, in the proportion of one part of $C_6H_5OH$ to more than one part of $S_2Cl_2$ while in the presence of a liquid extending vehicle.

9. The process of making a sulfuretted phenol product which comprises maintaining an amount of a phenolic body having a single six carbon ring corresponding molecularly to 1 part of $C_6H_5OH$, while in a liquid condition, adding thereto more than seven-sixths parts of sulfur chloride, and blowing a substantially inert elastic fluid through the reaction product while the latter is maintained at a temperature above 100° C.

10. The process of making a resin which comprises maintaining a phenolic body having a single six carbon ring in a liquefied condition, gradually adding sulfur chlorid thereto, in a sufficient amount to directly form a solid resin, and purifying the resin product by treatment with steam.

11. A product containing the solid reaction product of a phenol and a halide of sulfur, such product being insoluble in water, of firm-waxy to resinous consistency, substantially free from odor, capable of being blended with oils, waxes, bitumens and other resins, and with camphor, such product being soluble in large part at least, in alcohol, acetone, and in mixtures of acetone and amyl acetate, such product being soluble in caustic soda solution, as well as in sodium carbonate solution.

12. A process of making a resin which comprises reacting with sulfur chlorid on a phenol and passing an inert heated gaseous fluid through the heated reaction product.

13. A process which comprises adding to a phenolic body in a liquid state, such an amount of sulfur chlorid as to convert all of the said phenolic body into a normally solid resin.

14. A resinous reaction product of sulfur chlorid and a phenol which is of sufficient hardness to form a varnish base, such resinous body being soluble in common shellac solvents.

15. As a composition of matter a plastic, moldable, organic resinous body heavier than water, possessing a color similar to the color of bleached shellac, soluble in alcohol, acetone and similarly acting solvent, compatible with benzol and solvents acting like benzol, said body being derived by the action of an agent comprising a limited amount of a halide of a metalloid element upon a mother substance comprising a phenolic body capable of reacting therewith.

16. As a composition of matter a plastic, moldable, organic resinous body heavier than water, possessing a color similar to the color of bleached shellac, soluble in alcohol, acetone and similarly acting solvents compatible with benzol and solvents acting like benzol, said body being derived by the action of an agent comprising a limited amount of an inorganic chloride of a metalloid element upon a mother substance comprising a phenolic body capable of reacting therewith.

17. As a composition of matter a plastic, moldable, organic, resinous body heavier than water, possessing a color similar to the color of bleached shellac, soluble in alcohol, acetone and similarly acting solvents, compatible with benzol and solvents acting like benzol, said body being derived by the action of an agent comprising a limited amount of a halide of sulphur upon a mother substance comprising a phenolic body.

18. A body comprising a resinous reaction product of a phenol and a sulphurizing agent, such body being devoid of substantial quantities of mineral acid.

19. A resinous material comprising the reaction products of a phenolic body and a sulphurizing reagent chemically equivalent to an amount of sulphur chloride at least as great as the amount of said phenolic body, figured as $C_6H_5OH$, said body being free from red coloration 20. A yellow or straw colored resinous material free from hydrochloric acid, such product containing as its only resinous constituent the reaction products of a phenolic body and sulphur monochloride.

21. A process of forming a complex reaction product which comprises reacting with a resin-forming sulphur-containing body upon a mixture comprising an aromatic hydroxy body and an aliphatic unsaturated substance, both of which are capable of being reacted upon by said sulphur-containing body.

22. A sulphur plastic containing at least 50% of combined sulphur.

23. A rubbery sulphur plastic containing at least 50% of combined sulphur.

24. A shaped plastic product containing the plastic of claim 22.

25. A rubbery plastic product in shaped form comprising the plastic of claim 23.

26. A plastic body having a light color containing not substantially below 50% of combined sulphur.

CARLETON ELLIS.
JOSEPH V. MEIGS.